United States Patent
Zhao et al.

(10) Patent No.: US 11,902,628 B2
(45) Date of Patent: Feb. 13, 2024

(54) MASKED MODEL TRAINING OF A PREDICTION NETWORK

(71) Applicant: HULU, LLC, Santa Monica, CA (US)

(72) Inventors: Pengyu Zhao, Beijing (CN); Chunxu Xu, Beijing (CN); Xianghui Mao, Beijing (CN); Xiaohui Xie, Beijing (CN)

(73) Assignee: HULU, LLC, Santa Monica, CA (US)

( * ) Notice: Subject to any disclaimer, the term of this patent is extended or adjusted under 35 U.S.C. 154(b) by 43 days.

(21) Appl. No.: 17/374,606

(22) Filed: Jul. 13, 2021

(65) Prior Publication Data
US 2023/0019564 A1     Jan. 19, 2023

(51) Int. Cl.
| | |
|---|---|
| G06N 3/045 | (2023.01) |
| G06N 3/084 | (2023.01) |
| G06N 3/0895 | (2023.01) |
| G06N 3/09 | (2023.01) |
| H04N 21/442 | (2011.01) |
| H04N 21/466 | (2011.01) |
| H04N 21/482 | (2011.01) |
| H04L 65/612 | (2022.01) |

(52) U.S. Cl.
CPC ......... *H04N 21/4826* (2013.01); *G06N 3/045* (2023.01); *G06N 3/084* (2013.01); *H04L 65/612* (2022.05)

(58) Field of Classification Search
CPC .......................... G06N 3/0454; H04N 21/4826
See application file for complete search history.

(56) References Cited

U.S. PATENT DOCUMENTS

| | | | |
|---|---|---|---|
| 10,860,860 B1* | 12/2020 | Huynh | ................ G06F 16/739 |
| 2021/0303777 A1* | 9/2021 | Tong | ....................... G06N 3/08 |
| 2022/0254083 A1* | 8/2022 | Akhoundi | ........... G11B 27/031 |
| 2023/0230378 A1* | 7/2023 | Rüfenacht | ............. G06V 20/47 |
| | | | 382/100 |

OTHER PUBLICATIONS

Qiwei Chen, et al., "Behavior Sequence Transformer for E-commerce Recommendation in Alibaba", https://arxiv.org/pdf/1905.06874, May 15, 2019.

Ashish Vaswani, et al.,"Attention Is All You Need", https://arxiv.org/pdf/1706.03762.pdf, Dec. 6, 2017.

(Continued)

*Primary Examiner* — Hsiungfei Peng
(74) *Attorney, Agent, or Firm* — Kwan & Olynick LLP

(57) ABSTRACT

In some embodiments, a method receives a first sequence of inputs for processing via a sub-model of a plurality of sub-model. The plurality of sub-models are part of a main model. An input in the sequence of inputs is masked with a masked value to generate a second sequence of inputs. The method processes the second sequence of inputs using the sub-model to generate a sequence of features that correspond to the second sequence of inputs and processes the sequence of features to generate a first output. The first output is processed to generate a second output of the main model. The sub-model is trained based on a feature in the sequence of features that corresponds to the masked input and the second output.

20 Claims, 8 Drawing Sheets

(56) References Cited

OTHER PUBLICATIONS

Jason Brownlee, "A Gentle Introduction to Cross-Entropy for Machine Learning", https://machinelearningmastery.com/cross-entropy-for-machine-learning/, Dec. 22, 2020.
Wikipedia contributors, "Receiver operating characteristic", Wikipedia, The Free Encyclopedia, https://en.wikipedia.org/wiki/Receiver_operating_charteristic, Jun. 22, 2021.
Jacob Devlin, et al., "BERT: Pre-training of Deep Bidirectional Transformers for Language Understanding", https://arxiv.org/pdf/1810.04805.pdf, May 24, 2019.

* cited by examiner

MASKED MODEL TRAINING OF A PREDICTION NETWORK

BACKGROUND

A recommendation system may generate recommendations for a user account of a video delivery system while the user account is using the system online. For example, the system may recommend videos to the user account. The speed of generating the recommendations and quality of the recommendations may be important for the performance of the video delivery system. For example, the recommendations need to be generated within an acceptable time period for display in the interface. Also, the recommendations should be high quality recommendations that may be relevant to the interests of users of the user account, which may be more likely to be selected for playback. Accordingly, the hours that are spent using the video delivery system may increase as a user of the user account find more relevant videos to watch.

The recommendation system may use a model that processes the inputs to generate a ranking of items. For example, ranking of items may rank the relevance of videos to behavior of the user account. The quality of the ranking may depend on the training of the model. However, the training of the model may be complicated due to the complexity of the recommendation system.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
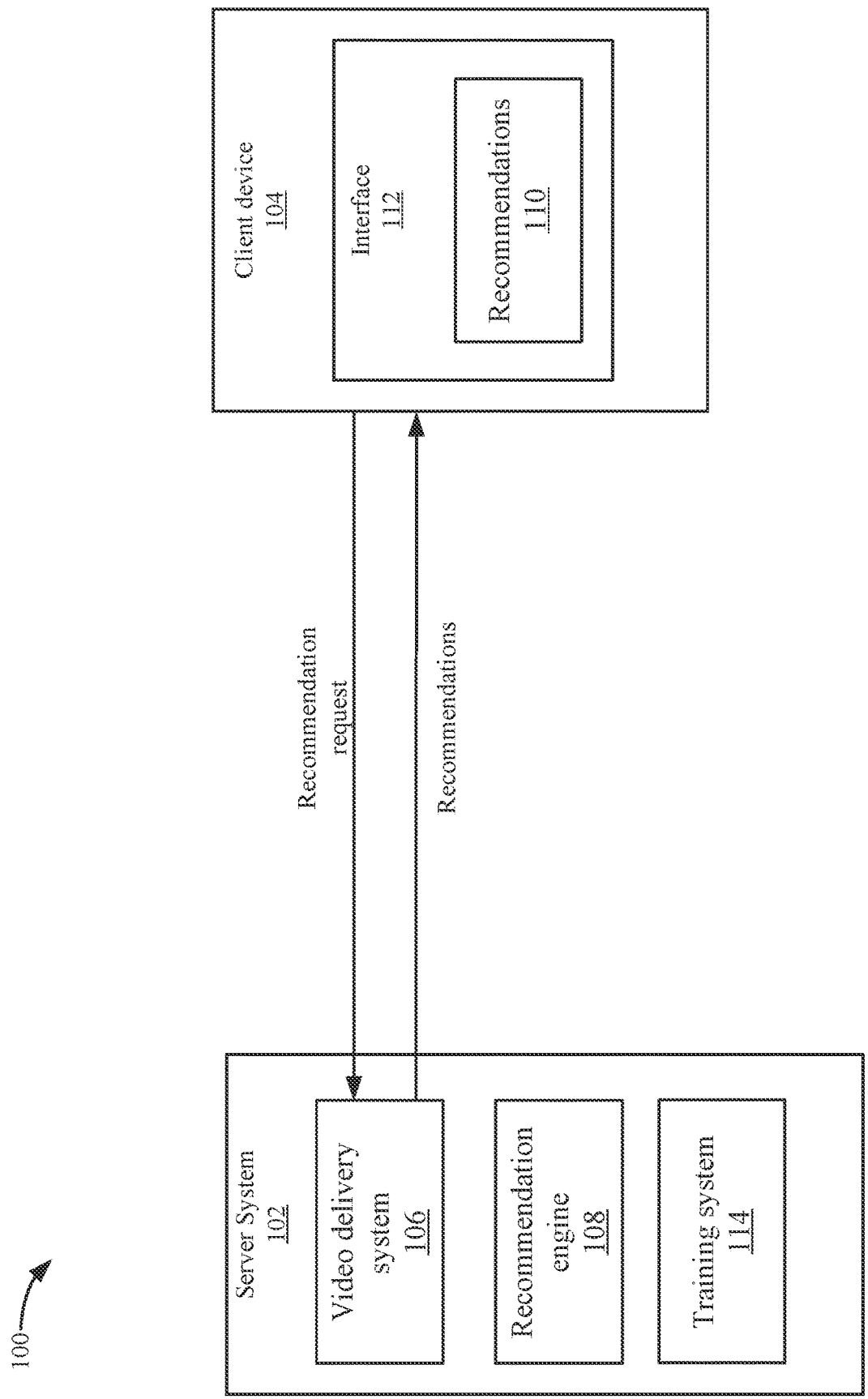
FIG. 1 depicts a simplified system for providing recommendations according to some embodiments.

Described herein are techniques for a prediction network. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system, such as a video delivery system, generates recommendations for user accounts in a live online environment. The recommendations may recommend content, such as videos, that may be considered relevant to the user accounts. A recommendation engine may use input that is associated with the user account, such as user behavior on the video delivery system, to generate the recommendations. The user behavior may include behavior that can be organized sequentially over time, such as a user watch history of content that occurred at different times.

The recommendation engine may use a main model that can generate predictions based on the input. The main model may include different components, such as multiple sub-models, that may perform different functions to generate an overall prediction. One of the sub-models may analyze inputs that may be sequential, such as the user watch history (e.g., a sequence of videos that have been watched). Other sub-models may receive input of other attributes, such as the age, gender, etc. of the user account. Some of the other attributes may or may not be sequential and the recommendation engine may use different sub-models to analyze these inputs. The outputs of the sub-models may be input into other sub-models, and so on, until an overall output is generated. The overall output may be prediction, which may be a probability, such as a click probability that a user account may select an item, such as a video. The recommendation engine may generate the click probabilities for multiple items to generate a ranking of items. Then, the recommendation engine can output a portion of the items as recommendations, such as the N highest ranked items.

The recommendation engine may train the sub-models. However, when the main model includes multiple sub-models that perform different functions and analyze different inputs, the training of the sub-models may be difficult. For example, the recommendation engine may train a sub-model using a function, such as a loss function. The function may calculate a difference between the overall output and a ground truth, which may be a known value or supervised value. The difference may be referred to as a loss and is used to train the sub-model. However, a sub-model may not receive adequate training when the loss, which is measured from the overall output of the recommendation system, is used. For example, the loss of the overall recommendation system may not be adequate to train parameters of the sub-model due to the long distance of the sub-model from the overall output. Accordingly, as will be described in more detail below, a training system closer to the sub-model is used to supplement the training from the overall output of the main model.

System Overview

FIG. 1 depicts a simplified system 100 for providing recommendations according to some embodiments. System 100 includes a server system 102 and a client device 104. Although a single instance of server system 102 and client device 104 is shown, multiples instances will be appreciated. For instance, server system 102 may include multiple servers or other computing devices to provide the functionality described herein. Also, system 100 may include multiple client devices 104 that interact with server system 102.

Server system 102 may include a video delivery system 106 that delivers videos to client devices 104. In some embodiments, video delivery system 106 may use a content delivery network (CDN) (not shown) to deliver the videos. The videos may be content that is requested by a user account associated with client device 104. For example, a user account may request a movie, an episode of a show, etc. Although videos are described, it will be understood that other content may also be delivered, such as a website, page of content, etc.

Client device 104 may be a computing device, such as a smartphone, living room device, personal computer, tablet, television, set-top box, etc. Client device 104 may include an interface 112 that may display content, such as a library of videos may be recommended for browsing. Also, a media player may play back a video that is requested from video delivery system 106. A user account may use client device 104 and may be associated with video delivery system 106 (e.g., the user account signs up for the service). A user that is associated with the user account may use client device 104.

Although multiple client devices 104 are not shown, video delivery system 106 may receive multiple requests from multiple client devices 104. Client devices 104 may send requests for content to video delivery system 106. For example, the requests may be for playback of different content, such as different videos.

Interface 112 may display recommendations at 110. The recommendations may recommend different kinds of content. For example, the content may be videos offered by video delivery system 106. However, other recommendations may be appreciated, such as display advertisements, non-video content, such as webpages, etc.

Video delivery system 106 may receive a request for recommendations from client 104. Then, video delivery system 106 should provide the recommendations back to client 104 for display on interface 112 within a certain amount of time, such as a time defined by a threshold. Generally, in an online environment, the time to generate the recommendations is very short and should be generated in a time taken to generate a display of the interface. A recommendation engine 108 may generate the recommendations. For example, the recommendations may be for content offered by video delivery system 106, such as videos. In some embodiments, video delivery system 106 may provide an interface that may display items that are ranked on interface 112. For example, items may be organized by collections, such as television, movies, etc. Recommendation engine 108 may rank items for the respective collections. Then, the items may be displayed as recommendations 110 on interface 112. Selections from the user account may be received, such as a selection of a video for playback.

A training system 114 may train a sub-model of recommendation engine 108. That is, training system 114 may train one component of the main model of recommendation engine 108. As will be discussed in more detail below, training system 114 may mask certain inputs into a sub-model to train the sub-model. The training process may train the sub-model using inputs and outputs that are located closer to the sub-model compared to the overall output of the main model. This provides a better training of the sub-model compared to using the overall output of recommendation engine 108. Also, the masking of the sub-model only appears during the training phase, and does not exist during operation of generating the recommendations in an online environment. Therefore, the masking-based training does not add any overhead in the sub-model or overall model during the live online environment as it is not used, which that it is very important for the live online environment that usually requires a fast response to user requests. The following will describe recommendation engine 108 in more detail and then the training of the sub-model.

Recommendation Engine

Figure 2:
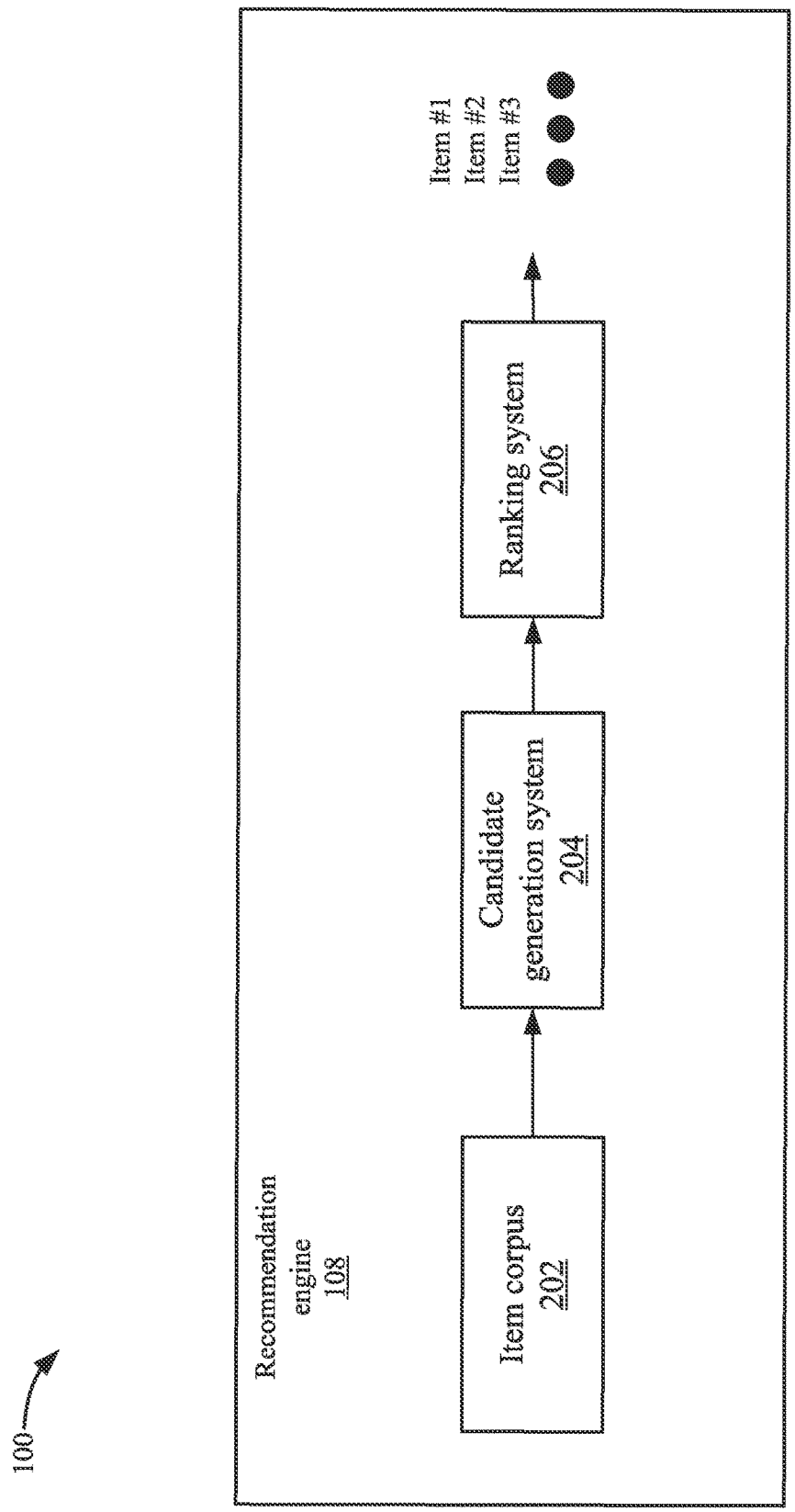
FIG. 2 depicts a more detailed example of a recommendation engine according to some embodiments.

FIG. 2 depicts a more detailed example of recommendation engine 108 according to some embodiments. Recommendation engine 108 includes an item corpus 202, candidate generation system 204 and a ranking system 206. Item corpus may include items that are eligible to be recommended. For example, item corpus 202 may include any item of video delivery system 106 that can be recommended, such as any videos that may be played back by a user account.

Candidate generation system 204 may generate candidates from item corpus 202. For example, item corpus 202 may include a large number of items, and ranking all of those items may be inefficient especially in an online environment where there is a limit in time that can be used to generate recommendations. For example, interface 112 may send a request for items and recommendation engine 108 has a limited amount of time to generate the recommendations to display in interface 112 in real-time (e.g., within a threshold). Accordingly, candidate generation system 204 may retrieve a portion of the items in item corpus 202 to reduce the time needed to rank the items. Candidate generation system 204 may use a model that selects some of the items that a user account might be interested in, such as for a collection. For example, candidate generation system 204 may select 200 movies that are candidates to recommend to a user account.

A ranking system 206 ranks the items that were retrieved by candidate generation system 204. Ranking system 206 may use a model to predict a relevance, such as a probability, for the items to characteristics of the user account. For example, ranking system 206 may generate a click probability of the items for the user account. The probability may represent a probability that the user account will select each respective item. Ranking system 206 may order the items by the predicted probability in the ranking. Then, video delivery system 106 may output at least a portion of the items in the ranking. It is noted that the use of the masked model training process that is described is removed during the online environment. That is, the trained sub-model and main model may be used to generate recommendations without using the masking as described herein.

In some embodiments, the training process that is described herein may be used to train a sub-model in candidate generation system 204 and/or ranking system 206. Although the main model in candidate generation system 204 and/or ranking system 206 may include different components, candidate generation system 204 and/or ranking system 206 may include a sub-model within the main model that may use the described training process.

Main Model Example

Figure 3:
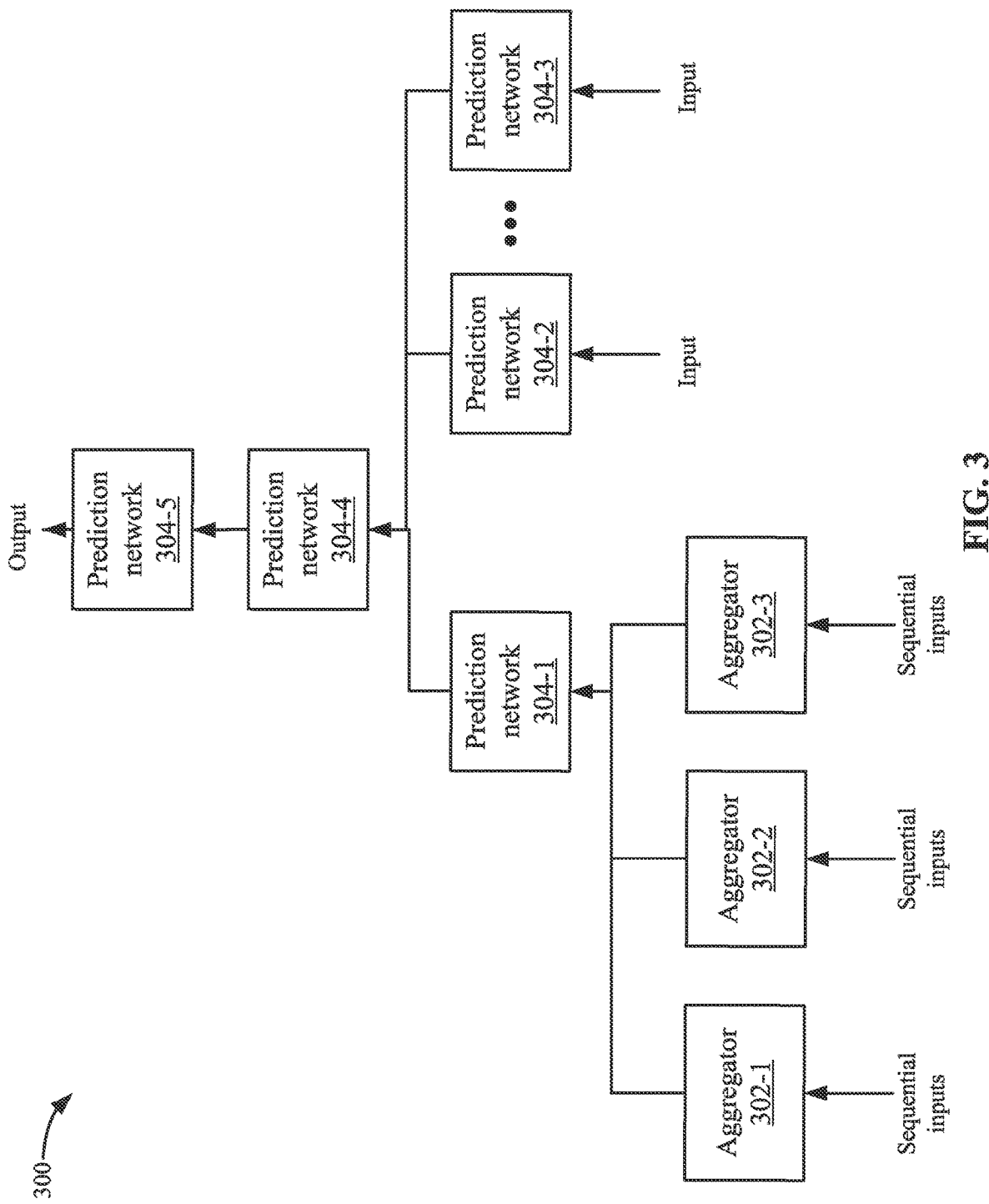
FIG. 3 depicts an example of a main model that can be used to generate recommendations according to some embodiments.

FIG. 3 depicts an example of a main model 300 that can be used to generate recommendations according to some embodiments. Main model 300 may be a series of components (e.g., sub-models or other processes) that interact to generate an overall output. As discussed above, the overall output may be a relevance of an item that measures how relevant the item is to the input. Recommendation engine 108 may perform an analysis of multiple items separately to generate the respective output, such as a selection probability, for each item. In total, main model 300 may generate selection probabilities for multiple items based on input. Although the following structure of main model 300 is described, it will be understood that main model 300 may include different configurations of components.

The different components may analyze different information to generate an output, where outputs of components are used to generate the overall output. In some embodiments, different components may include sub-models that analyze different types of inputs. Also, components may analyze the output of other components. In some embodiments, aggregators 302-1 to 302-3 may analyze sequential inputs to generate a representation of the input. In some embodiments, aggregators 302 aggregates the sequential inputs into a fixed-size (usually a single) feature. Although three aggregators 302 are described, different numbers of aggregators may be appreciated.

The sequential inputs may be inputs that are organized based on time. For example, a history of user behavior over time may be input as the sequential inputs. In some embodiments, the sequential inputs may be based on a history of content that has been classified as being interacted with by user accounts, such as content has been watched or content has an impression but is not watched. The watched behavior may be based on a user account playing back a certain amount of a video above a threshold. An impression, but not watched behavior may be when a user account may have interacted with a video, but not played the video, such as reviewed details about the video. Different user behaviors for the sequential inputs may be appreciated.

Aggregators 302 may receive different sequential inputs and extract features, such as user interests, from the sequential inputs. Aggregators 302 may extract user interests from the watch history that may reflect the latent patterns in the sequential inputs. For example, aggregator 302 may investigate the sequential relationship of the inputs to compress the sequential inputs into a representation that represent the interests found in the watch history. The output may be a fixed length representation of the sequential inputs where the output is smaller than the sequential inputs. For example, a sequence of embeddings is reduced to a single embedding that represents the sequence.

Main model 300 may also include other prediction networks 304-1 to 304-5. As shown, prediction network 304-1 may receive input from aggregators 302-1 to 302-3. Also, prediction networks 304-2 to 304-3 may receive input for the user account. The input may include sequential inputs or other input that may not be sequential, such as a user account age, gender, time information, location information, etc. The output of prediction networks 304-1, 304-2, and 304-3 are input into a prediction network 304-4, which can combine the inputs. Then, prediction network 304-5 may generate an output. As discussed above, although the configuration of components of main model 300 are described, it will be understood that different configurations may be appreciated.

Aggregators 302 may include a sub-model that receives the sequential inputs. As shown, the output of aggregators 302 may be input through other components, such as prediction networks 304, until the output is generated. Each prediction network 304 may also include a sub-model that analyzes the inputs and generates an output. As the information flows upward from the initial inputs to the output, the amount of information that is analyzed may become more focused. That is, aggregator 302 may receive a full array of sequential inputs. The output of aggregator 302 may be a more focused representation that represents the sequential inputs. Then, another prediction network 304 may analyze the more focused representation to generate an even more focused representation. This process continues until the overall output is generated. As information flows towards the overall outputs, the sub-models may become less complicated in that less parameters are needed to generate an output due to analyzes more focused information.

When using the overall output to train a sub-model of aggregator 302, a difference between the overall output and a known output may be used. This may be measured by a loss function where a loss is calculated between the overall output generated by main model 300 and the known outcome. Then, the loss is used to adjust the parameters of the sub-model of aggregator 302 based on minimizing the loss. For example, a gradient of the loss is used to update the parameters that were used to calculate the output. For example, the gradient may change the value of the parameters by a certain amount based on the gradient to make the output closer to the known output. It will be recognized that different methods of training a sub-model may be used.

Aggregator 302 is positioned a farther distance away from the overall output than other prediction networks, such as prediction network 304-5. This may be referred to a shallow position in main model 300 due to the distance from the overall output and the closeness to the initial inputs. Also, aggregator 302 may receive a larger or more diverse set of inputs due to the shallow position. To analyze the larger set of inputs, the sub-model may require a larger amount of parameters. As discussed above, the inputs become more focused in deeper positions in main model 300. For example, as inputs become more focused, a sub-model may include fewer parameters as there may be fewer possible variations in inputs. The shallow position of aggregator 302 in main model 300 and the large amount of parameters that need to be trained may not allow the sub-model in aggregator 302 to be trained properly from the overall output of main model 300. For example, a problem referred to as gradient attenuation occurs due to the long distance between the output and aggregator 302. Gradient attenuation may flow from the output to the input and the gradient may vanish as the distance from the output increases.

The gradient attenuation may lead to a discrepancy in convergence rates between training the sub-model for aggregator 302 and a sub-model for another prediction network that may be closer to the overall output, such as prediction network 304-5. For example, prediction network 304-5 may be more focused in that it receives more focused information that has been extracted via other sub-models. Prediction network 304-5 may also include fewer parameters because the information that is analyzed is more focused. Further, the back propagation from the overall output to prediction network 304-5 may also be closer in distance. All these factors may make the training process of prediction network 304-5 different from aggregator 302. For example, the training of the sub-model of aggregator 302 may be underfitting the data, which means the training is too general. However, the training of prediction network 304-5 may be overfitting the data, which means the training is too specific. Without adequate training, the sub-model of aggregator 302 may not fully extract the information from the sequential inputs, such as the interests expressed in the user watch history may not be fully captured or accurate. The problems with aggregator 302 may propagate through main model 300, which may result in recommendations that may not be optimal.

Aggregator Example

Figure 4:
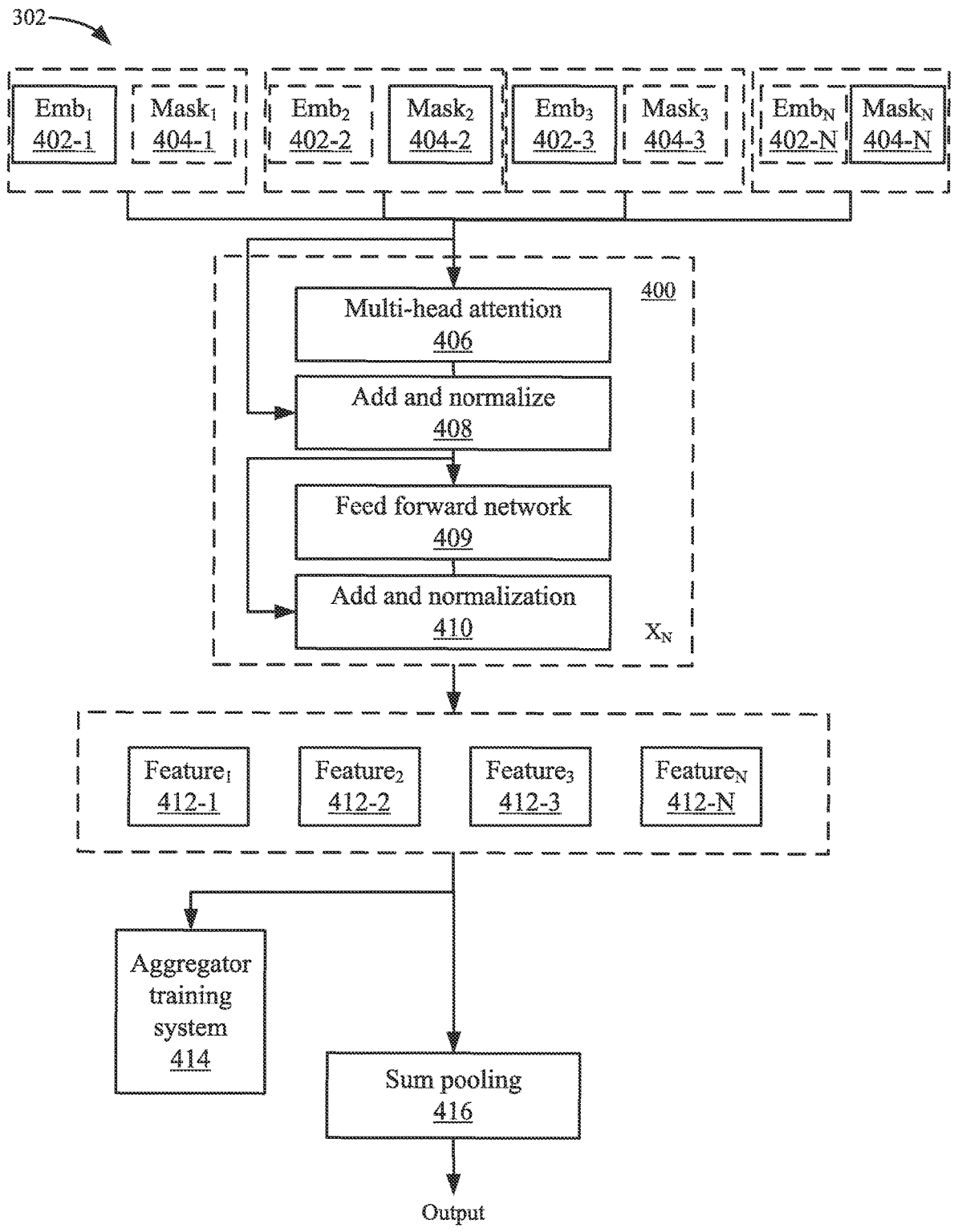
FIG. 4 depicts a more detailed example of an aggregator according to some embodiments.

The following will describe an example of aggregator 302 and then an improvement to the training process will be described. FIG. 4 depicts a more detailed example of aggregator 302 according to some embodiments. In some embodiments, aggregator 302 may implement a sub-model 400, which may be a self-attention (SA) sub-model, to model the input. Although a self-attention sub-model is described, other sub-models may be used. However, problems with training self-attention sub-model may be worse than other sub-models due to the larger number of parameters found in the self-attention sub-model. For example, the self-attention sub-model includes more parameters than a sub-model that just uses sum pooling due to the way the self attention mechanism works to apply attention to the sequence of inputs compared to sum pooling not applying any weights to the inputs.

An aggregator training system 414 may use an output of sub-model 400 to perform training of the parameters of sub-model 400. For example, aggregator training system 414 may calculate a difference from the output of sub-model 400 to a desired output, which may be referred to as a loss. Using the loss from an output closer to sub-model 400 may improve the training of the parameters of sub-model 400. Training system 414 may then change the parameters of sub-model 400 to minimize the loss. An advantage is that the training works directly on the output of sub-model 400 instead of using the loss from the overall output of main model 300. This improves the gradient update of the parameters of sub-model 400 due to the relevancy of the output to the parameters of sub-model 400. That is, the loss is attributable directed to the parameters used in sub-model 400 to generate the output of sub-model 400 and not to parameters from other sub-models that are used to generate the overall output.

Sub-model 400 may receive inputs that may be represented by embeddings 402, such as embedding$_1$ (EMB$_1$) 402-1, embedding$_2$ (EMB$_2$) 402-2, embedding$_3$ (EMB$_3$) 402-3 to embedding$_N$ (EMB$_N$) 402-N. Each embedding may be a representation in a space for a sequential input. For example, each embedding may be information for a watch behavior that was recorded for a user account.

The training of sub-model 400 may use a masking process that may mask different input embeddings 402. For example, possible mask embeddings may be provided for each respective embedding, such as a mask$_1$ 404-1, a mask$_2$ 404-2, a mask$_3$ 404-3, to a mask$_N$ 404-N. A mask embedding 404 may be a value that uses information separate from the sequential inputs (e.g., user behavior) or is not associated with the sequential inputs. That is, the value of mask embedding 404 is not derived from user behavior of a user account. Mask embeddings 404 may be a parameter for sub-model 400, and may be trained to be different values. Other values may also be used, such as random values, set values, etc.

In some embodiments, aggregator training system 414 may mask a random number of input embeddings 402. For example, aggregator training system 414 may mask a certain amount of the input sequence with a mask embedding, such as 5% of the sequential inputs. As shown in the inputs, a dotted box may represent an input that is not used, and a solid box may represent an input that is used. For example, input embedding$_1$ 402-1, mask$_2$ embedding 404-2, input embedding$_3$ 402-3, and mask$_N$ embedding 404-N are input into sub-model 400. In some embodiments, a mask embedding 404 replaces an input embedding 402, but mask embedding 404 may be combined in different ways with input embedding 402 to generate an input to sub-model 400. In some embodiments, aggregator training system 414 may use a random variable P$_j$ that is uniformly sampled from a range [0,1] as follows:

$$e_j = \begin{cases} e_{[MASK]}, & p_j < 0.05 \\ e_j, & p_j \geq 0.05 \end{cases}$$

where e is the embedding that is used as input, $e_{[MASK]}$ is mask embedding 404, and $e_j$ is input embedding 402, and j is a position number in the input sequence. The above selects from mask embedding 404 and input embedding 402 using the value of the random variable.

An aggregator 302 may combine sequential input into a fixed-length representation that represents the sequence. A primitive aggregator may employ a sum pooling on the sequence of embeddings for compression to a representation, which may be represented by:

$$\sum_{j=1}^{T} e_j,$$

where the sum of embeddings e at each position j of the input sequence are calculated. As mentioned above, implementing sum pooling includes logic that is not as complicated as an attention mechanism. However, this combination may not capture the latent relationships between the inputs. Also, it is noted that since sum pooling does not capture relationships between inputs, masking inputs would not be used as a training technique.

To capture the relationships, sub-model 400 may use an attention mechanism to analyze the sequential input. Different attention mechanisms may be used. The attention mechanism may map an input to an output. The output may be computed as a weighted sum of the input values, where the weight assigned to each value may be computed by sub-model 400. The use of attention may be useful when analyzing the sequential inputs and the relationship between these sequential inputs. For example, the use of the weights may apply higher weights to inputs that may be more relevant in the sequence to an item and apply lower weights to inputs that are less relevant in the sequence to the item. The attention mechanism allows the output to focus different attention on the inputs while producing an output and the sub-model 400 allows inputs to interact with each other. For example, sub-model 400 calculates attention of all other inputs with respect to one input. In some embodiments, the attention mechanism includes three parts: query, key, and value. The query (e.g., one position in the sequence) attends to the keys (e.g., other positions in the sequence) to compute the attention weights based on a similarity between the two. Then, sub-model 400 uses the weights to compute a weighted sum on the values (values are usually the same as the keys). This generates the self-attention output for the given input. The above procedure is applied to all the input sequences. This calculation may be referred to as scaled dot product attention that is a type of attention that utilizes scaled dot-product to calculate similarity. The difference is that calculation has an extra dimension (K dimension) for adjustment that prevents the inner product from becoming too large.

In sub-model 400, a multi-head attention function 406 may project the input each time with different projections based on the parameter values. On each of the projected versions, multi-head attention function 406 may perform the attention function in parallel using output values. Here, the multi-head attention is provided by calculating the attention h times. A parameter is different each time Q, K, and V undergo a linear transformation. Subsequently, the result from the h iterations of scaled-dot transformation attention is spliced. Multi-head attention allows the sub-model to jointly attend to information from different representation subspaces at different positions of the sequence. A single attention head may not be able to analyze information at different positions. Using multi-head attention may further complicate sub-model 400 compared to using sum pooling and single attention.

The output of multi-head attention function 406 is processed by an add and normalize function 408. Add and normalize function 408 may add the input of multi-head attention function 406 to the output of multi-head attention function 406, and then normalize the result. A feed forward network 409 may be a fully connected network that may learn features from the output of add and normalize function 408. An add and normalize function 410 may then add the output of feed forward network 409 to the input to feed forward network 409, and then normalize the output. This forms one layer of sub-model 400.

Sub-model 400 may include a number of layers $X_N$. That is, the output of a first layer may then be input into another layer to be processed again. X number of layers may be provided. This may stack the layers, which may increase the scale of the processing. Theoretically, the higher the number of layers, the better the results that can be processed as the extraction of relevant features can be improved by additional layers. However, the addition of additional layers may not improve results when using the traditional training method. For example, as discussed above, the distance from the overall output affects the gradient that can be applied to sub-model 400. The extra layers add additional complexity to the sub-model, which makes training of sub-model 400 even harder using the gradient of the overall output.

The output of sub-model 400 is features 412. For example, for each sequential input, a corresponding feature is output. For example, a feature$_1$ 412-1 corresponds to embedding$_1$ 402-1; a feature$_2$ 412-2 corresponds to mask$_2$ 404-2; a feature$_3$ 412-3 corresponds to embedding$_3$ 402-3; and feature$_N$ 412-N corresponds to mask$_N$ 404-N. In some embodiments, sub-model 400 outputs a corresponding number of features 412 as the same number of inputs. Features 412 may be a representation of the corresponding input, but the representation may be generated based on the analysis of the relationship of the sequential inputs.

Aggregator 302 may include a sum pooling layer 416 that may compress the sequential features 412 into another representation, such as fixed length representation. The output may represent the sequential inputs. Because different attention is applied to the inputs in sub-model 400, the output of sum pooling layer 416 may be more accurate than applying the primitive aggregator described above.

Aggregator training system 414 may use the output of sub-model 400 (e.g., features 412) and the information from the mask embeddings 404 to train parameters of self-attention sub-model 400. As shown, compared to using the output of the main model 300, the output of sub-model 400 is much closer to sub-model 400 in distance.

Training of the Self-Attention Sub-Model

Figure 5:
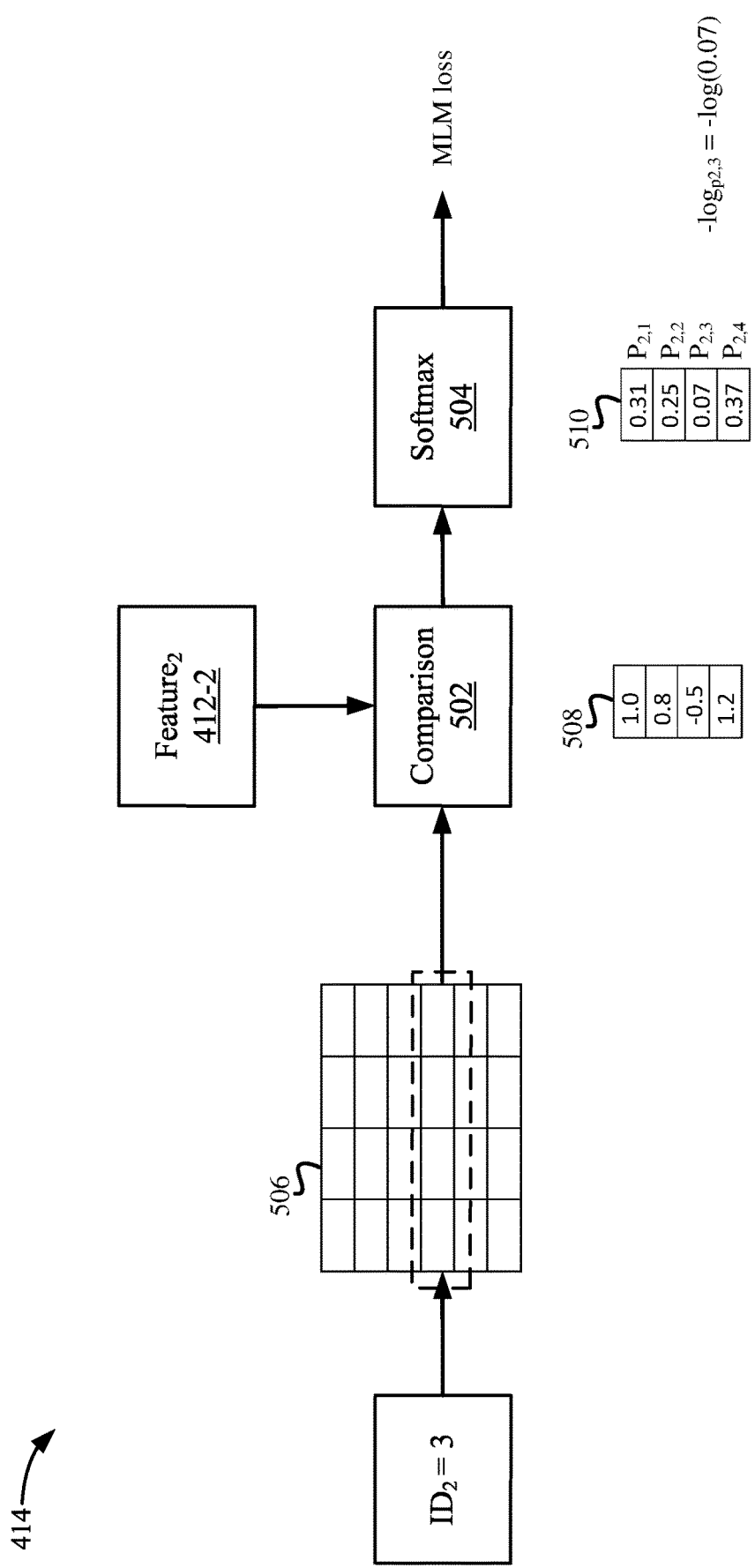
FIG. 5 depicts a more detailed example of an aggregator training system according to some embodiments.

FIG. 5 depicts a more detailed example of aggregator training system 414 according to some embodiments. Aggregator training system 414 may adjust parameters of sub-model 400 according to the analysis of feature$_2$ 302-2, which is a masked feature because it corresponds to a mask embedding 404. Aggregator training system 414 may perform the analysis for each masked feature. Sub-model 400 may be trained by adjusting the parameters of sub-model 400 to predict an original value of the input embedding 402 based on the context provided by other non-masked inputs. Accordingly, aggregator training system 414 may train the parameters of sub-model 400 to predict the original embedding based on the relationships found in the sequential inputs. This may strengthen the understanding of the relationships between sequential inputs.

One method of performing the training will be described but other methods may be appreciated. An embedding table 506 may include embeddings that correspond to possible inputs (e.g., videos offered by video delivery service 106). Input embeddings 402-1 to 402-N may each have a corresponding embedding in embedding table 506. An embedding may be associated with one or more values and be represented by a row in embedding table 506. The corresponding embedding for feature$_2$ 412-2 is an embedding with ID$_2$=3. The number "3" in this case identifies the row of the corresponding input embedding in embedding table 506. Feature$_2$ may be the corresponding feature for the ID, where "2" is the position in the input sequence.

A comparison operation 502 may compare feature$_2$ 412-2 to each embedding in embedding table 506. For example, comparison 502 computes the similarity between feature$_2$ 412-2 and other embeddings in embedding table 506. The values at 508 indicate the similarity of feature$_2$ 412-2 to each respective embedding in embedding table 506, such as a probability for each input. In some embodiments, a higher score, such as 1.2, may indicate a higher similarity between feature$_2$ 412-2 and the respective embedding and a lower score, such as 0.8, may indicate a lower similarity. In some embodiments, comparison 502 may perform a dot product of a respective embedding in embedding table 406 and the value of feature$_2$ 412-2.

The output of comparison 502 may be input into a Softmax function 504 to generate a probability. Softmax function 504 may normalize the similarity scores to a probability distribution for the loss function. In some embodiments, the Softmax function may not need to be used. However, aggregator training system 414 may use a loss function that uses probability distributions to generate the loss. The output of Softmax function 504 is shown at 510, which provides probabilities for each respective embedding. The loss attempts to make the similarity between feature$_2$ 412-2 and embedding$_3$ more similar than the other embeddings. In some embodiments, a cross-entropy loss may be used, which is a measure of the difference between two probability distributions. The cross-entropy loss may be calculated given the probability of the event using the negative log (probability), which may be $-\log_{p2,3} = -\log(0.07)$. Cross-entropy measures the similarity between two distributions. For example, assume two distributions are $[p_1, p_2, \ldots p_N]$ and $[y_1, y_2, \ldots y_N]$, the cross-entropy loss is $-(y_1 \log p_1 + y_2 \log p_2 + \ldots y_N \log p_N)$. In this case, one distribution is the Softmax output p, and the other distribution is a vector y=[0, 0, 1, 0] that indicates the ground-truth label (e.g., the embedding of ID=3). Then, the cross-entropy loss becomes −log $p_{2,3}$, which measures a difference between the output and the original embedding (as only $y_3$=1). Aggregator training system 414 may adjust the parameters to minimize the cross-entropy loss by adjusting the parameters to predict the original embedding. Other methods may also be used, such as max-margin loss.

The loss from aggregator training system 414 provides more supervision in aggregator 302 and an adequate gradient update compared to using the overall output of main model 300. This is because aggregator training system 414 calculates the loss directly on the output of sub-model 400, which provides more supervision because the output of sub-model is compared to the expected overall value. The loss provides enough gradient to update the parameters of self-attention sub-model 400 to converge to an acceptable loss because the parameters that are adjusted are the ones that are directly used to generate the output. Also, training parameters that are learned via the loss can predict the original input (and not the masked input) at the masked position, which means the training learns the intrinsic relationship of the sequential inputs in interactive patterns of the sequential inputs. Self-attention sub-model 400 interprets the masked embedding as a placeholder at that position that has the same dimension of the other inputs. The MLM loss tries to recover the original input at the masked position. This is because the training using the masked inputs relies on the relationships of the non-masked inputs to adjust the parameters to predict the original input.

In some embodiments, aggregator training system 414 may use the loss from the features 412 in addition to the loss from the output of main model 300 to perform the training. That is, both outputs may be used. However, the loss from the overall output of main model 300 may not be used to perform the training.

Figure 6:
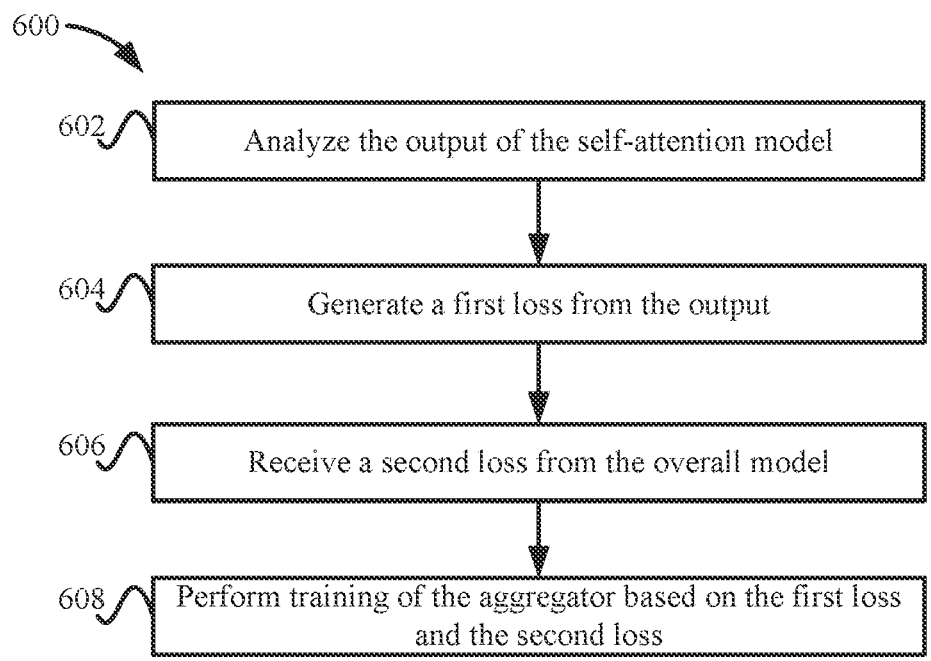
FIG. 6 depicts a simplified flowchart of a method for training of a model of the aggregator according to some embodiments.

FIG. 6 depicts a simplified flowchart 600 of a method for training of sub-model 400 of aggregator 302 according to some embodiments. At 602, aggregator training system 414 analyzes the output of sub-model 400 as described above. At 604, aggregator training system 414 generates a first loss from the output of sub-model 400. At 606, aggregator training system 414 receives a second loss from the overall output of main model 300. The second loss may be calculated based on comparing an output of main model 300 to an expected output. Different methods may be used to determine the second loss. For example, the second loss may be a ranking loss that calculates the difference between the click probability output for a video compared to the expected click probability. This is referred to as a ranking loss as the output of main model 300. The ranking loss may also be a cross-entropy loss, but other types of losses may be used. The prediction of the main model 300 (e.g., the overall output) is the predicted probability p of the inputs, and the label (e.g., ground-truth) y is whether the user account really selects (e.g., clicks on) the item (e.g., video) or not (e.g., y=1 if click, y=0 if not click). The ranking cross-entropy loss is −(y log p+(1−y) log (1−p)), which will make p larger for the click samples, and make 1−p larger (make p smaller) for the not click samples. The ranking loss is different from the first loss because the first loss is based on comparing an outputted representation of the input to an expected representation of the input. The outputted representation is different from a click probability, and the parameters of sub-model 400 are not directed to predicting a click probability. Also, the loss of sub-model 400 is computed over the embedding table while the ranking loss is computed over click/not click (two values). The loss of sub-model 400 is self-supervised as input is used as the supervision, which only depends on the input sequences, and the loss is created on its own. That is, a known output, such as actual user behavior, is not needed to determine the loss for sub-model 400. However, the ranking loss is based on supervised information, such as the user account's actual behavior for the target item that is collected from video delivery system 106. The click/not click supervised information represents the actual user account behavior.

At 608, aggregator training system 414 performs training of aggregator 302 based on the first loss and the second loss. Aggregator training system 414 may use the first loss and the second loss differently to perform the training. For example, aggregator training system 414 may separately use the first loss to train parameters of the sub-model of aggregator 302. Then, aggregator training system 414 may use the second loss to train the parameters of the sub-model of aggregator 302. Also, aggregator training system 414 may combine the first loss and the second loss and use the combined loss to train the parameters of the sub-model of self-attention sub-model 400. For example, aggregator training system 414 may combine the first loss and the second loss together into a single loss. Also, aggregator training system 414 may use a weight to balance the losses, e.g., loss $L=w_1L_1+L_2$, where $L_1$ is the MLM loss and $L_2$ is the ranking loss. As the MLM loss is an auxiliary loss in addition to the ranking loss, aggregator training system 414 maintains the original ranking loss, and appends an additional loss on the loss function.

Conclusion

Accordingly, aggregator training system 414 may be inserted in a component of an overall model to train a sub-model of the component. Aggregator training system 414 may use the output of the sub-model of the component to train parameters of the sub-model. This may train the sub-model of the component better than using the output of the overall model. The result is parameters that may be trained in using an adequate gradient that is complementary to the training based on the overall output. Also, the overhead of using the masked model training process is removed during the online environment.

System

Figure 7:
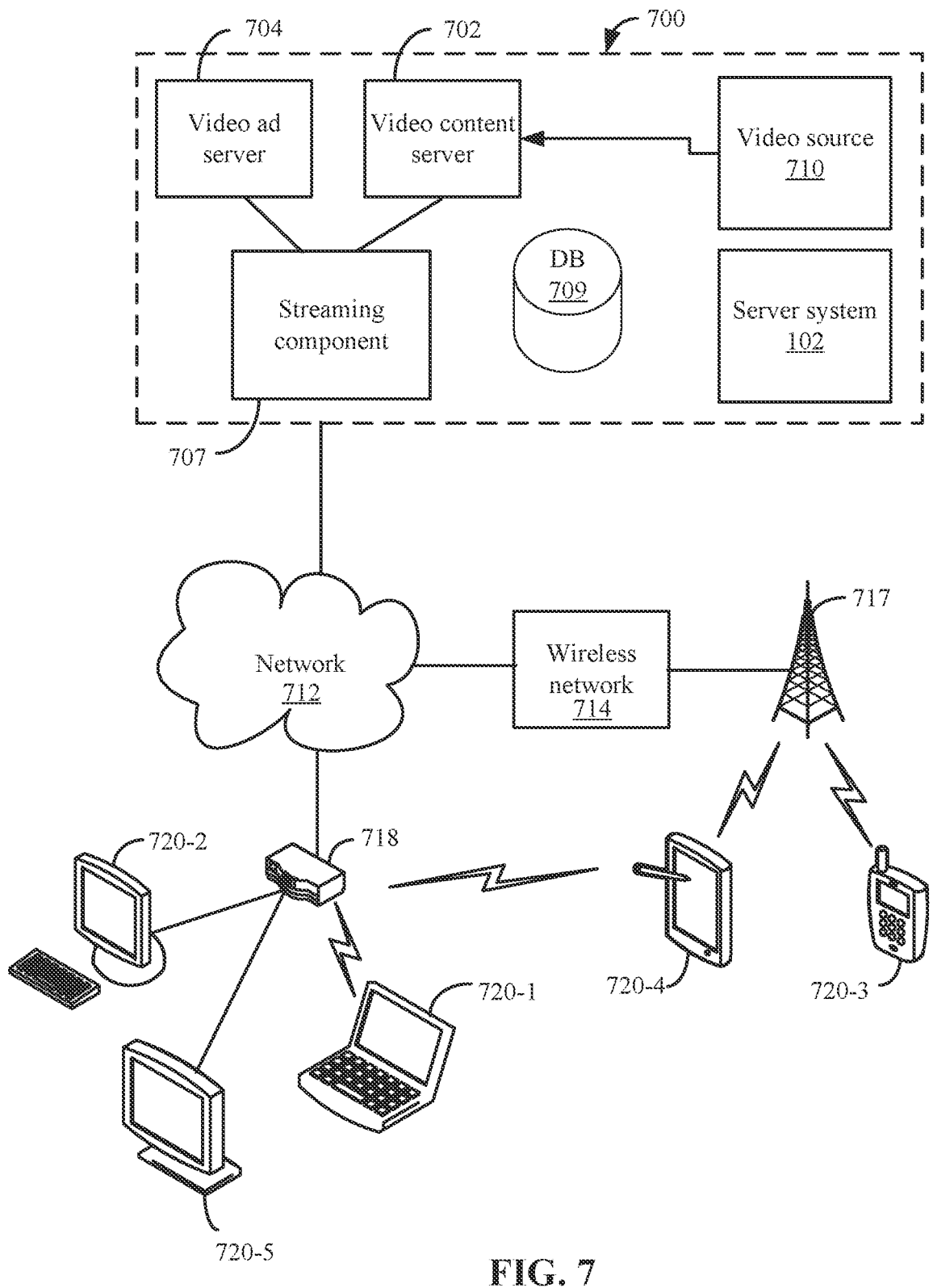
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 700, a public service message, or some other information. The video advertising server 704 may serve the video advertising segments as directed by a user interface controller (not shown).

The video streaming system 700 also may include server system 102.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, and/or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HyperText Transfer Protocol (HTTP) and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
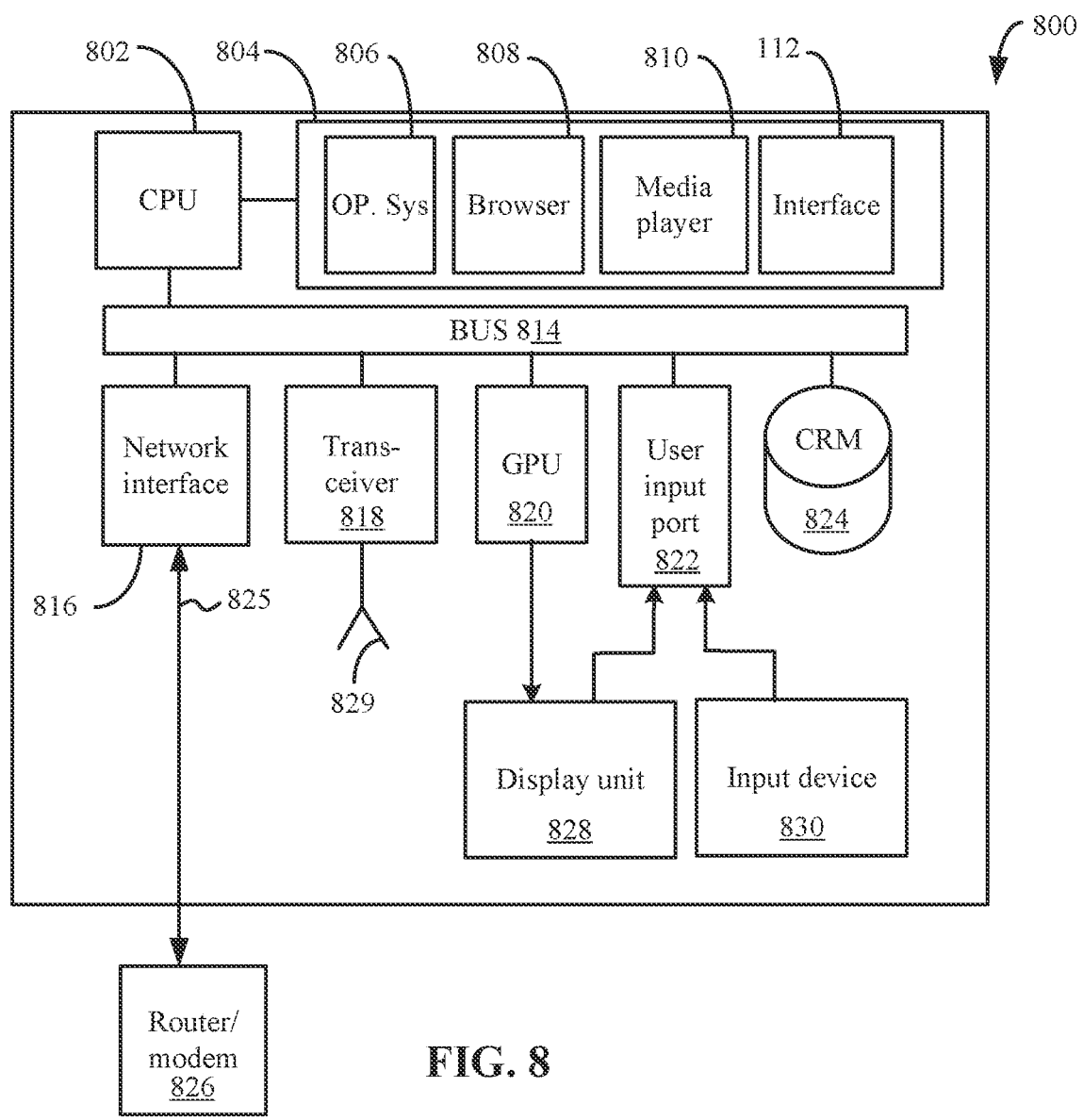
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The modules may further include interface 112. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured or operable to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured or operable to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera, or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Example Embodiments

In some embodiments, a method comprising: receiving, by a computing device, a first sequence of inputs for processing via a sub-model of a plurality of sub-models, wherein the plurality of sub-models are part of a main model; masking, by the computing device, an input in the sequence of inputs with a masked value to generate a second sequence of inputs; processing, by the computing device, the second sequence of inputs using the sub-model to generate a sequence of features that correspond to the second sequence of inputs; generating, by the computing device, a second output of the main model based on the sequence of features; and training, by the computing device, the sub-model based on a feature in the sequence of features that corresponds to the masked input and the second output.

In some embodiments, the first sequence of inputs is based on behavior of a user account that is using a video delivery system.

In some embodiments, the masked value is based on information separate from the behavior of the user account.

In some embodiments, the second output represents a relevance of the item to the sequence of inputs and other input processed by the main model.

In some embodiments, the relevance comprises a probability of selection of the item.

In some embodiments, the sequence of features is a representation of the second sequence of inputs.

In some embodiments, the method further comprising: generating a first output from the sequence of features that represents the second sequence of inputs, wherein the first output is used to generate the second output of the main model.

In some embodiments, masking the input comprises: randomly masking one of the first sequence of inputs.

In some embodiments, processing the second sequence of inputs comprises: applying attention to the second sequence of inputs based on a relationship between inputs in the second sequence of inputs, wherein the attention applies weights to the inputs differently.

In some embodiments, processing the second sequence of inputs comprises: processing the second sequence of inputs using multiple layers in the sub-model to generate the sequence of features.

In some embodiments, the first output is processed by one or more other sub-models in the plurality of sub-models to generate the second output.

In some embodiments, the one or more other sub-models receive input other than the first sequence of inputs.

In some embodiments, training the sub-model comprises: comparing the feature that corresponds to the masked input to the first sequence of inputs, calculating a similarity between the feature that corresponds to the masked input and the first sequence of inputs; and using the similarity to train the sub-model.

In some embodiments, using the similarity to train the sub-model comprises: adjusting a parameter of the sub-model to increase a similarity of the feature that corresponds to the masked input to the corresponding input in the first sequence of inputs compared to a similarity for other inputs in the first sequence of inputs.

In some embodiments, training the sub-model comprises: generating a first value based on a feature in the sequence of features that corresponds to the masked input; generating a second value based on the second output; and adjusting a parameter of the sub-model first value and the second value.

In some embodiments, the sub-model comprises a self-attention sub-model that applies attention to inputs in the second sequence of inputs based on relationships between the inputs.

In some embodiments, a method comprising: receiving, by a computing device, a request for a recommendation of content; applying, by the computing device, the request to a trained model to obtain a prediction relating to data in the request; generating, by the computing device, a recommendation based on the prediction; and sending the recommendation as a response to the request, wherein the trained model comprises a trained sub-model of a plurality of sub-models, and wherein the training sub-model is trained by: masking an input in a sequence of inputs with a masked value in the sub-model; generating an output of the main model based on a sequence of features that is generated by the sub-model; and training the sub-model based on a feature in the sequence of features that corresponds to the masked input and the output of the main model.

In some embodiments, a method comprising: receiving, by a computing device, a sequence of first outputs from a first sub-model in a main model that are generated from a sequence of inputs; receiving, by the computing device, a second output from a second sub-model that is based on the sequence of first outputs and a second input; and training, by the computing device, a parameter of the sub-model based on the sequence of first outputs and the second output, wherein the sequence of first outputs is a representation of the sequence of inputs and the second output is a relevance of an item to the sequence of inputs and the second input.

In some embodiments, the method further comprising: masking an input in the sequence of inputs with a masked value to generate a second sequence of inputs, wherein the sequence of first outputs are generated using the second sequence of inputs.

In some embodiments, training the parameter comprises: comparing a first output in the sequence of first outputs that corresponds to the masked input to the second sequence of inputs, calculating a similarity between the first output that corresponds to the masked input and the second sequence of inputs; and using the similarity to train the sub-model.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:

receiving, by a computing device, a first sequence of inputs for processing via a sub-model of a plurality of sub-models, wherein the plurality of sub-models are part of a main model;

masking, by the computing device, an input in the first sequence of inputs with a masked value to generate a second sequence of inputs;

processing, by the computing device, the second sequence of inputs using the sub-model to generate a sequence of features that correspond to the second sequence of inputs, wherein the sub-model comprises a self-attention sub-model that applies attention to inputs in the second sequence of inputs based on relationships between the inputs;

generating, by the computing device, a first output of the main model based on the sequence of features; and training, by the computing device, the sub-model based on a feature in the sequence of features that corresponds to the masked input and the first output, wherein training the sub-model comprises:

generating a first value based on a feature in the sequence of features that corresponds to the masked input;
generating a second value based on the first output; and
adjusting a parameter of the sub-model using the first value and the second value.

2. The method of claim 1, wherein the first sequence of inputs is based on behavior of a user account that is using a video delivery system.

3. The method of claim 2, wherein:
the masked value is based on information separate from the behavior of the user account.

4. The method of claim 1, wherein the first output represents a relevance of an item to the first sequence of inputs and other input processed by the main model.

5. The method of claim 4, wherein the relevance comprises a probability of selection of the item.

6. The method of claim 1, wherein the sequence of features is a representation of the second sequence of inputs.

7. The method of claim 1, further comprising:
generating a second output from the sequence of features that represents the second sequence of inputs, wherein the second output is used to generate the first output of the main model.

8. The method of claim 1, wherein masking the input comprises:
randomly masking one of the first sequence of inputs.

9. The method of claim 1, wherein the attention applies weights to the inputs differently.

10. The method of claim 1, wherein processing the second sequence of inputs comprises:
processing the second sequence of inputs using multiple layers in the sub-model to generate the sequence of features.

11. The method of claim 7, wherein the first output is processed by one or more other sub-models in the plurality of sub-models to generate the first output.

12. The method of claim 11, wherein the one or more other sub-models receive input other than the first sequence of inputs.

13. A method comprising:
receiving, by a computing device, a first sequence of inputs for processing via a sub-model of a plurality of sub-models, wherein the plurality of sub-models are part of a main model;
masking, by the computing device, an input in the first sequence of inputs with a masked value to generate a second sequence of inputs;
processing, by the computing device, the second sequence of inputs using the sub-model to generate a sequence of features that correspond to the second sequence of inputs;
generating, by the computing device, a first output of the main model based on the sequence of features; and
training, by the computing device, the sub-model based on a feature in the sequence of features that corresponds to the masked input and the first output,
wherein training the sub-model comprises:
comparing the feature that corresponds to the masked input to the first sequence of inputs,
calculating a similarity between the feature that corresponds to the masked input and the first sequence of inputs; and
using the similarity to train the sub-model, wherein using the similarity to train the sub-model comprises:
adjusting a parameter of the sub-model to increase a similarity of the feature that corresponds to the masked input to the corresponding input in the first sequence of inputs compared to a similarity for other inputs in the first sequence of inputs.

14. A non-transitory computer-readable storage medium having stored thereon computer executable instructions, which when executed by a computing device, cause the computing device to be operable for:
receiving a first sequence of inputs for processing via a sub-model of a plurality of sub-models, wherein the plurality of sub-models are part of a main model;
masking an input in the first sequence of inputs with a masked value to generate a second sequence of inputs;
processing the second sequence of inputs using the sub-model to generate a sequence of features that correspond to the second sequence of inputs, wherein the sub-model comprises a self-attention sub-model that applies attention to inputs in the second sequence of inputs based on relationships between the inputs;
generating a first output of the main model based on the sequence of features; and
training the sub-model based on a feature in the sequence of features that corresponds to the masked input and the first output, wherein training the sub-model comprises:
generating a first value based on a feature in the sequence of features that corresponds to the masked input;
generating a second value based on the first output; and
adjusting a parameter of the sub-model using the first value and the second value.

15. The non-transitory computer-readable storage medium of claim 14, wherein the first output represents a relevance of an item to the first sequence of inputs and other input processed by the main model.

16. The non-transitory computer-readable storage medium of claim 14, wherein training the sub-model comprises:
comparing the feature that corresponds to the masked input to the first sequence of inputs,
calculating a similarity between the feature that corresponds to the masked input and the first sequence of inputs; and
using the similarity to train the sub-model.

17. The non-transitory computer-readable storage medium of claim 16, wherein using the similarity to train the sub-model comprises:
adjusting a parameter of the sub-model to increase a similarity of the feature that corresponds to the masked input to the corresponding input in the first sequence of inputs compared to a similarity for other inputs in the first sequence of inputs.

18. The non-transitory computer-readable storage medium of claim 14, further operable for:
generating a second output from the sequence of features that represents the second sequence of inputs, wherein the second output is used to generate the first output of the main model.

19. The non-transitory computer-readable storage medium of claim 14, wherein masking the input comprises:
randomly masking one of the first sequence of inputs.

20. The non-transitory computer-readable storage medium of claim 14, wherein processing the second sequence of inputs comprises:
processing the second sequence of inputs using multiple layers in the sub-model to generate the sequence of features.

* * * * *